(12) United States Patent
Lin et al.

(10) Patent No.: US 9,019,212 B2
(45) Date of Patent: Apr. 28, 2015

(54) PASSIVE ARCHITECTURE AND CONTROL METHOD FOR SCANNING A TOUCH PANEL

(75) Inventors: Min-Jhih Lin, Kaohsiung (TW); Chia-Mu Wu, Hsinchu (TW)

(73) Assignee: Elan Microelectronics Corporation, Hsinchu (TW)

( * ) Notice: Subject to any disclaimer, the term of this patent is extended or adjusted under 35 U.S.C. 154(b) by 712 days.

(21) Appl. No.: 12/946,289

(22) Filed: Nov. 15, 2010

(65) Prior Publication Data
US 2011/0122088 A1    May 26, 2011

(30) Foreign Application Priority Data

Nov. 23, 2009   (TW) ............................... 98139751 A (51) Int. Cl.
*G06F 3/041*   (2006.01)
(52) U.S. Cl.
CPC ................................. *G06F 3/0416* (2013.01)

(58) Field of Classification Search
USPC .................................................. 345/173–178
See application file for complete search history.

(56) References Cited

U.S. PATENT DOCUMENTS

| | | | | |
|---|---|---|---|---|
| 8,284,080 | B2 * | 10/2012 | Ng et al. ........................ | 341/26 |
| 8,358,285 | B2 * | 1/2013 | Leung et al. ................... | 345/174 |
| 2004/0130537 | A1 * | 7/2004 | Kong et al. .................... | 345/173 |
| 2008/0158180 | A1 * | 7/2008 | Krah et al. ..................... | 345/173 |
| 2008/0309623 | A1 | 12/2008 | Hotelling et al. | |
| 2009/0251427 | A1 * | 10/2009 | Hung et al. .................... | 345/173 |
| 2009/0251437 | A1 * | 10/2009 | Hung et al. .................... | 345/174 |
| 2010/0194682 | A1 * | 8/2010 | Orr et al. ....................... | 345/156 |
| 2010/0328237 | A1 * | 12/2010 | Chang et al. .................. | 345/173 |

* cited by examiner

*Primary Examiner* — Roy Rabindranath
(74) *Attorney, Agent, or Firm* — Muncy, Geissler, Olds & Lowe, P.C.

(57) ABSTRACT

A passive architecture for scanning a touch panel includes a master IC and at least one passive touch IC connected to the master IC. The master IC generates a command to configure the scan parameters of the at least one passive touch IC, and the at least one passive touch IC scans the touch panel with the scan parameters in response to the command.

21 Claims, 8 Drawing Sheets

|     | TR0       | TR1       | TR2       | TR3       |
|-----|-----------|-----------|-----------|-----------|
| TR4 | (TR0,TR4) | (TR1,TR4) | (TR2,TR4) | (TR3,TR4) |
| TR5 | (TR0,TR5) | (TR1,TR5) | (TR2,TR5) | (TR3,TR5) |
| TR6 | (TR0,TR6) | (TR1,TR6) | (TR2,TR6) | (TR3,TR6) |
| TR7 | (TR0,TR7) | (TR1,TR7) | (TR2,TR7) | (TR3,TR7) |

|  | TR0 | TR1 | TR2 | TR3 |
|---|---|---|---|---|
| TR4 | (TR0,TR4) | (TR1,TR4) | (TR2,TR4) | (TR3,TR4) |
| TR5 | (TR0,TR5) | (TR1,TR5) | (TR2,TR5) | (TR3,TR5) |
| TR6 | (TR0,TR6) | (TR1,TR6) | (TR2,TR6) | (TR3,TR6) |
| TR7 | (TR0,TR7) | (TR1,TR7) | (TR2,TR7) | (TR3,TR7) |

PASSIVE ARCHITECTURE AND CONTROL METHOD FOR SCANNING A TOUCH PANEL

FIELD OF THE INVENTION

The present invention is related generally to a touch panel and, more particularly, to a passive architecture and a control method for scanning a touch panel.

BACKGROUND OF THE INVENTION

There has been proposed an active architecture for scanning a touch panel, in which the scan parameter, such as the traces to be scanned, scan mode, scan time and analog parameter, of a slave touch integrated circuit (IC) to scan the touch panel are configured in the slave touch IC in advance, and the slave touch IC scans the touch panel with the scan parameter and then sends the detected data to a master touch IC for judgment. For a larger scale touch panel, to reduce the scan time, two or more slave touch ICs will be used to simultaneously scan different portions of the touch panel. Since the scan parameter of each slave touch IC is configured in advance, and must be different from that of any other slave touch IC due to the responsibility of scanning the traces of different portion of the touch panel, the slave touch ICs have different firmware and analog parameter from each other. As a result, each slave touch IC is specified and can scan only the fixed and specific traces that have been configured. Therefore, each slave touch IC is impossible to be exchanged with any other slave touch IC, and is also impossible to be reconfigured with a new scan parameter according to the detected data for scanning another portion of the touch panel. In addition to lack of application flexibility, it has not the capability of solving the ghost phenomenon of the touch panel.

SUMMARY OF THE INVENTION

An object of the present invention is to provide a passive architecture and a control method for scanning a touch panel.

Another object of the present invention is to provide a passive architecture and a control method for a touch panel to increase the application flexibility.

Still another object of the present invention is to provide a passive architecture and a control method for a touch panel to solve the ghost phenomenon.

According to the present invention, a passive architecture for scanning a touch panel includes a master IC connected to at least one passive touch IC. The master IC provides each of the at least one passive touch IC with a respective scan parameter for scanning the touch panel, and instructs the at least one passive touch IC to scan the touch panel with their respective scan parameters.

According to the present invention, a control method for scanning a touch panel includes generating a command by a master IC to configure the scan parameters of at least one passive touch IC to scan the touch panel, and scanning the touch panel by the at least one passive touch IC with the scan parameters in response to the command.

Since the scan parameters for the at least one passive touch IC to scan the touch panel, such as the traces to be scanned, scan modes, scan time and analog parameters, are all provided by the master IC, there is no need to prepare specific firmware for each individual passive touch IC. In addition, the master IC is able to generate a new command depending on demands, for reconfiguring the scan parameters of the at least one passive touch IC to scan the touch panel again.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
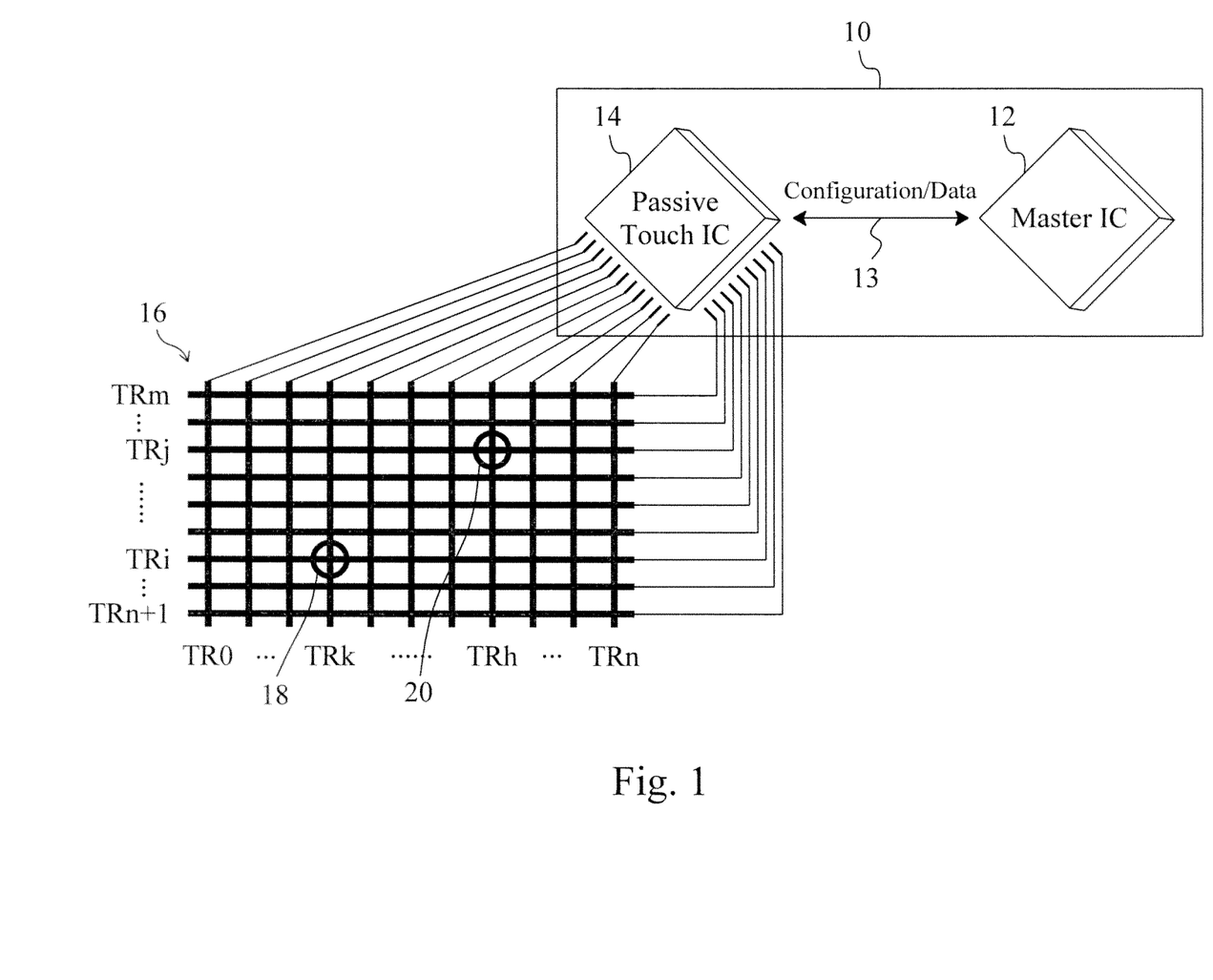
FIG. 1 is a schematic diagram of a first embodiment according to the present invention.

FIG. 1 is a schematic diagram of a first embodiment according to the present invention, in which a passive architecture 10 is used to scan a touch panel 16. The touch panel 16 has traces TR0-TRm, and the passive architecture 10 includes a master IC 12 and a passive touch IC 14 connected to the touch panel 16, for example connected to the traces TR0-TRm. By way of a universal transfer interface 13, the master IC 12 controls the passive touch IC 14 to scan the touch panel 16 and provides the scan parameter required by such scanning. In an embodiment, the master IC 12 generates a command and transmits the command to the passive touch IC 14 through the universal transfer interface 13 to configure the scan parameter of the passive touch IC 14 to scan the touch panel 16, and in response to the command, the passive touch IC 14 scans the touch panel 16 with the scan parameter. For instance, through the command, the master IC 12 configures the passive touch IC 14 to scan the traces TR0-TRm, and in response to the command, the passive touch IC 14 scans the traces TR0-TRm. After scanning, the passive touch IC 14 transmits the detected data to the master IC 12 by way of the universal transfer interface 13, and the master IC 12 judges with the detected data to determine whether to reconfigure the scan parameter of the passive touch IC 14 to scan the touch panel 16 again. For example, when the master IC 12 concludes a ghost phenomenon is detected by judging with the detected data coming from the passive touch IC 14, it may generate a new command to direct the passive touch IC 14 to scan some certain portions of the touch panel 16, for example those portions where a ghost point likely appears. Therefore, in response to the new command, the passive touch IC 14 scans the traces TRk, TRi, TRh and TRj of the possible ghost points 18 and 20, and then the master IC 12 may identify the real points according to the detected data, thereby solving the ghost phenomenon. In one embodiment, when the master IC 12 supposes that the detected data coming from the passive touch IC 14 are abnormal, for example with excessively high or excessively low analog-to-digital conversion (ADC) values, the master IC 12 will reconfigure the scan parameter of the passive touch IC 14 and instruct the passive touch IC 14 to scan the touch panel 16 again.

Figure 2:
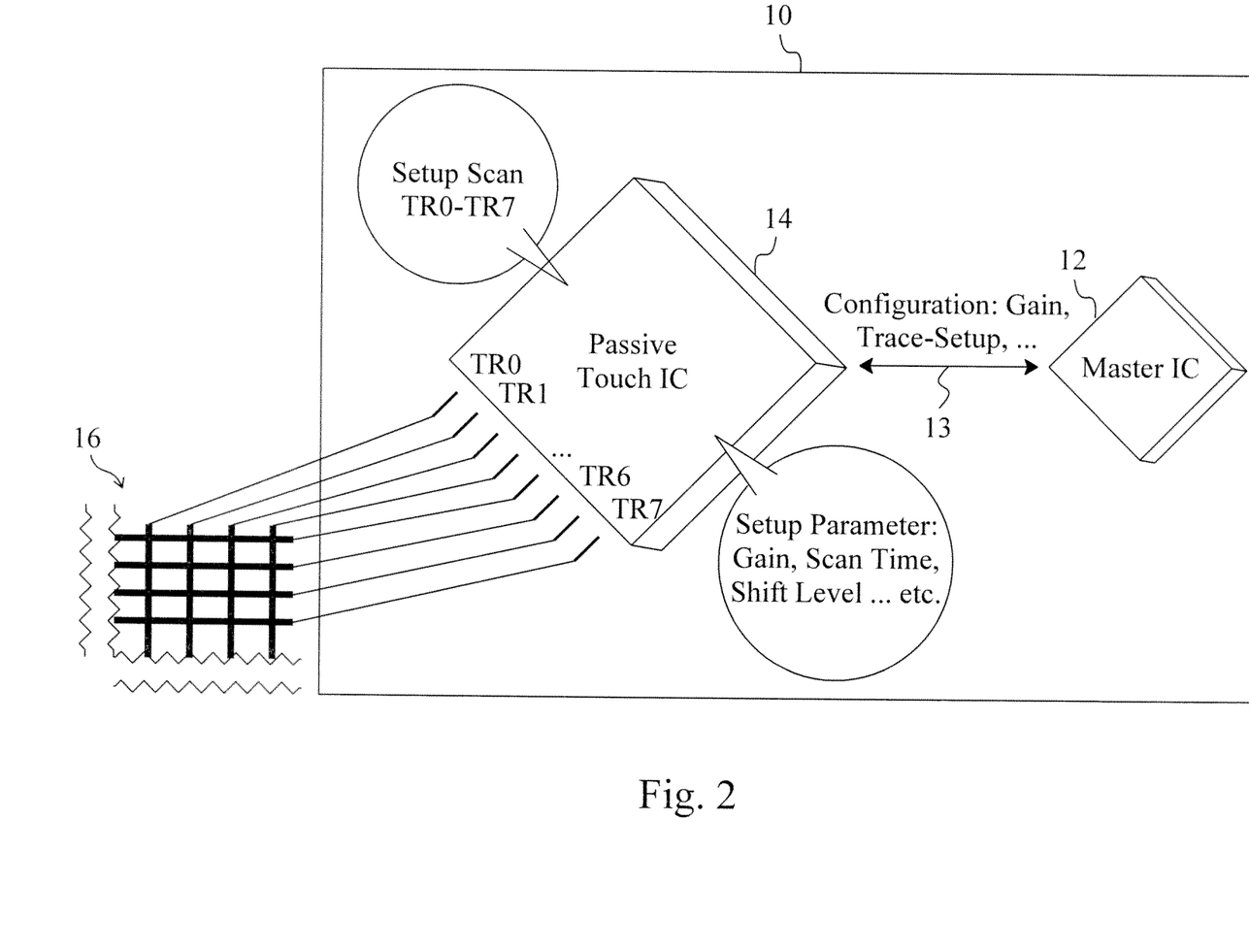
FIG. 2 is a schematic diagram of a master IC configuring the traces to be scanned and analog parameter of a passive touch IC.
Figure 3:
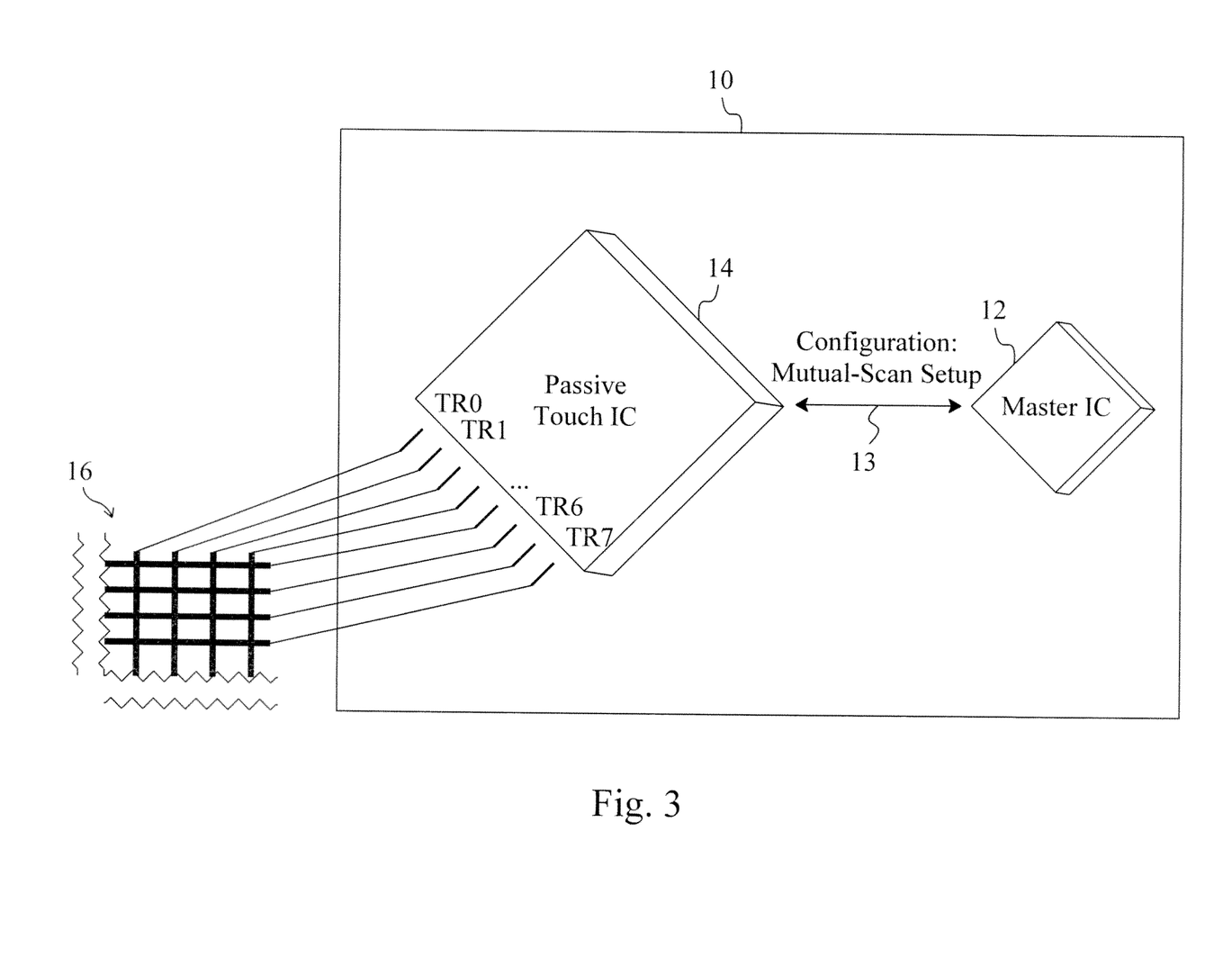
FIG. 3 is a schematic diagram of a master IC configuring the trace combinations to a passive touch IC.
Figure 4:
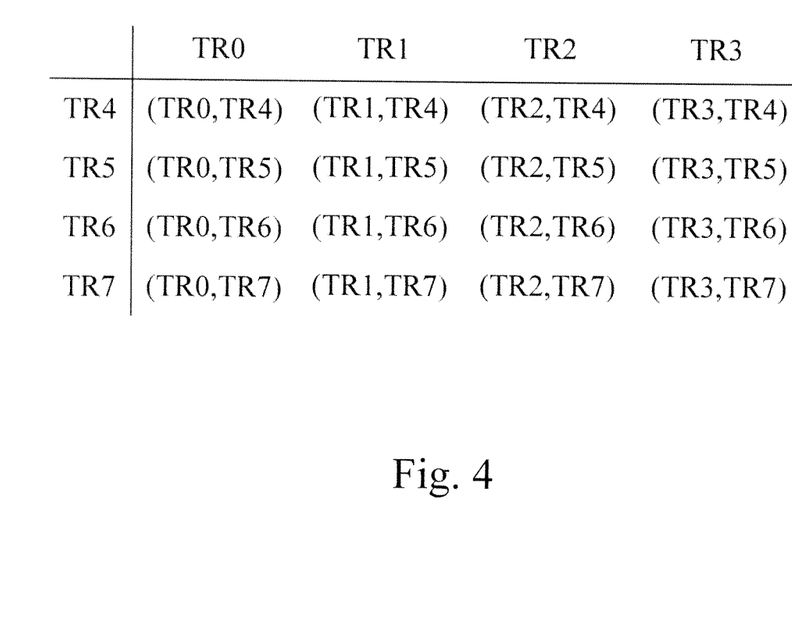
FIG. 4 is a table of trace combinations.
Figure 5:
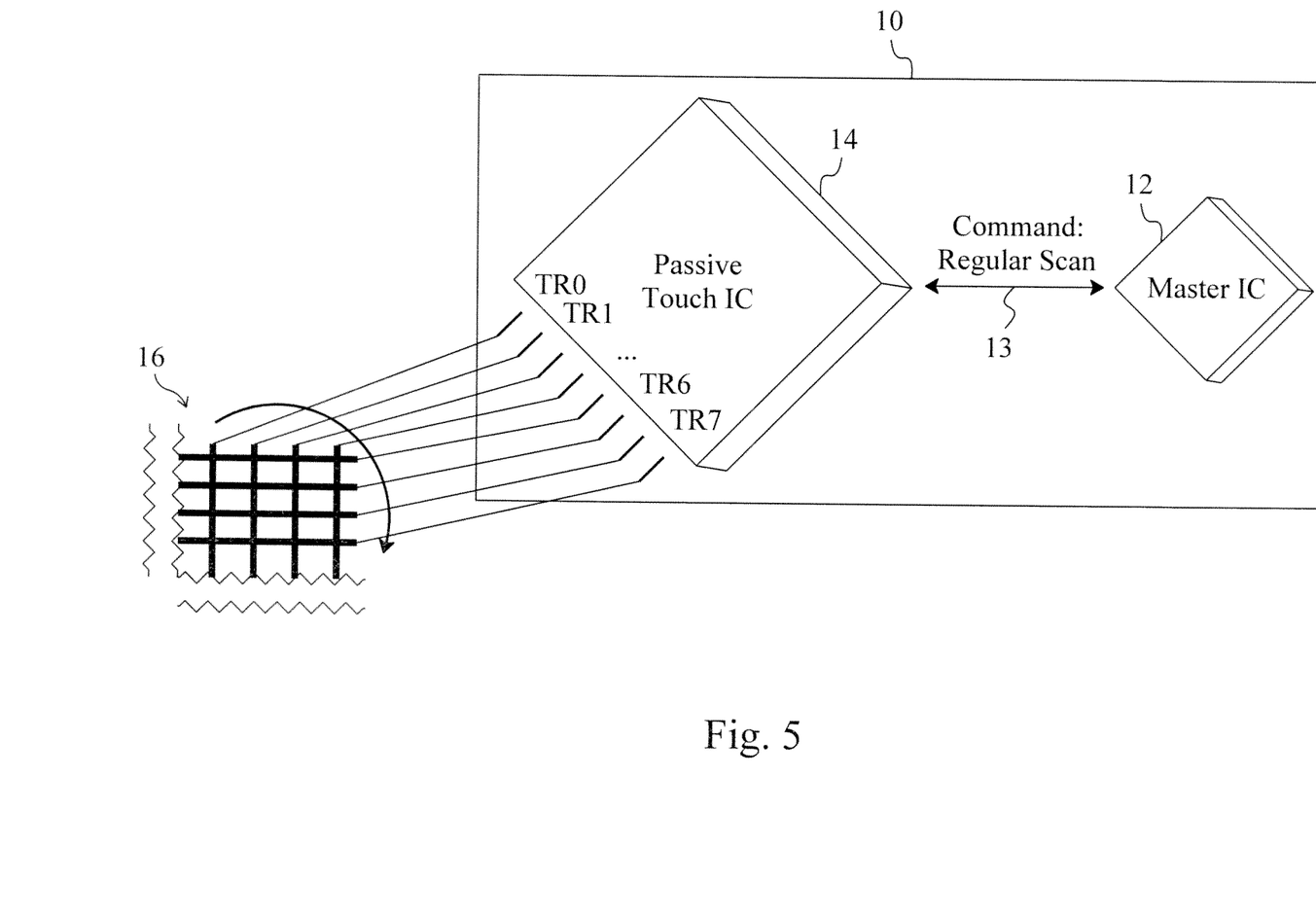
FIG. 5 is a schematic diagram of a master IC configuring a regular scan mode to a passive touch IC.
Figure 6:
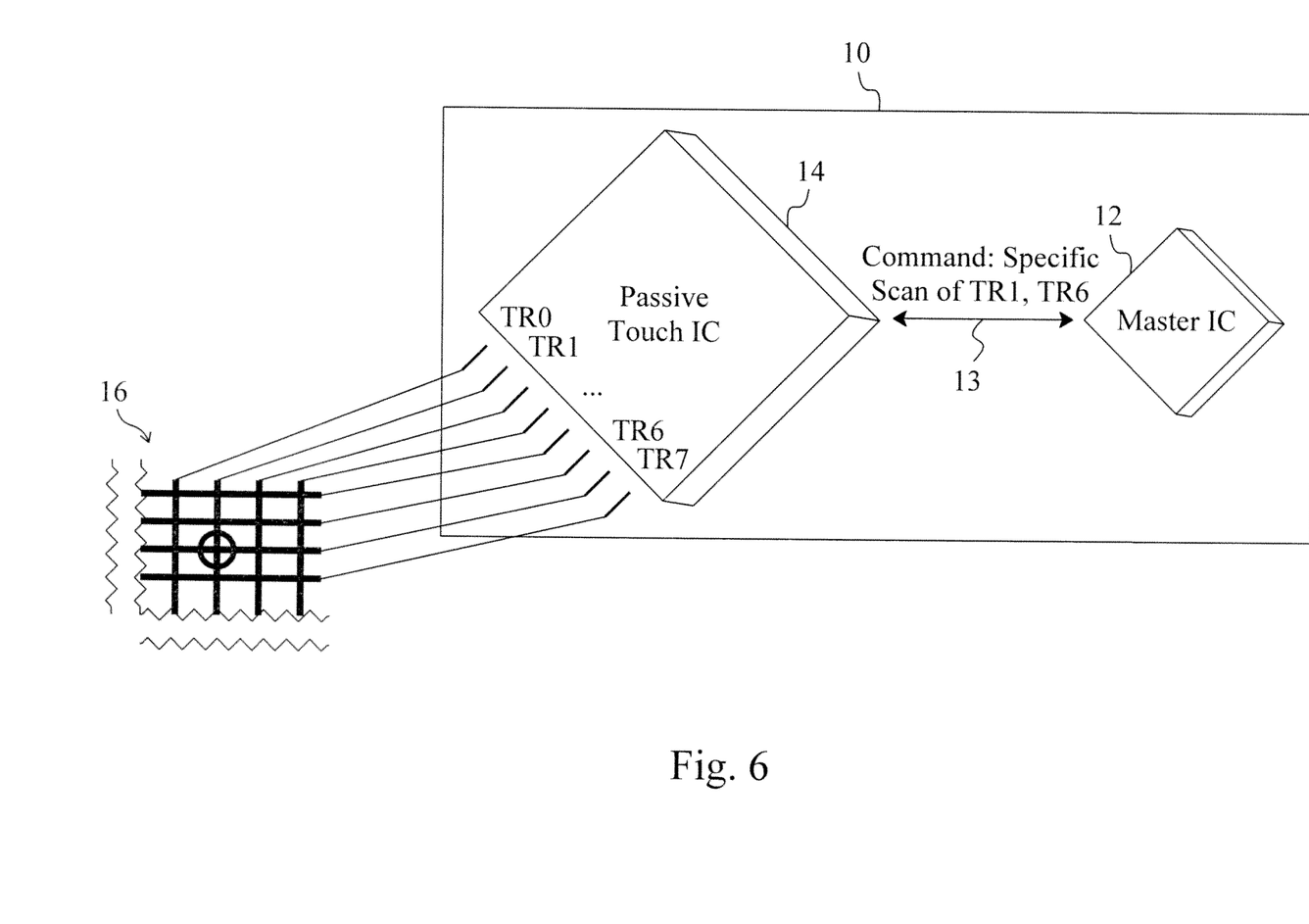
FIG. 6 is a schematic diagram of a master IC configuring a specific scan mode to a passive touch IC.

In this embodiment, the passive touch IC 14 is an existing touch IC, for example the projected capacitance touch IC, so there is no need for modification of the relevant hardware and additional cost otherwise required by such modification. The universal transfer interface 13 may be an inter-integrated circuit ($I^2C$) or a serial peripheral interface (SPI). The scan parameter for the passive touch IC 14 to scan the touch panel 16 includes the traces to be scanned, a scan mode and an analog parameter, all of which are able to be adjusted and set by the master IC 12. As shown in FIG. 2, the master IC 12 may setup the traces to be scanned and the analog parameter of the passive touch IC 14 by way of the universal transfer interface 13. For instance, the master IC 12 may setup the scan range of the passive touch IC 14 as the traces TR0-TR7, and setup the analog parameter to be used in scanning of the traces TR0-TR7, for example including gain, scan time and shift level. Then the passive touch IC 14 scans the traces TR0-TR7 with the setup analog parameter. As shown in FIG. 3, the master IC 12 may setup trace combinations to the passive touch IC 14 through the universal transfer interface 13. For instance, subject to the memory capacity of the passive touch IC 14, the master IC 12 may setup the combinations of the traces (TR0, TR1, TR2, TR3) and the traces (TR4, TR5, TR6, TR7) as shown in FIG. 4 to the passive touch IC 14. When a ghost phenomenon appears, the master IC 12 gives a mutual-scan command, and according thereto, the passive touch IC 14 scans the trace combinations of the possible ghost points to identify the real points. As shown in FIG. 5, the master IC 12 may setup the scan mode of the passive touch IC 14 as regular scan through the universal transfer interface 13, so the passive touch IC 14 will sequentially scan the traces TR0, TR1, TR2 . . . . As shown in FIG. 6, the master IC 12 may setup the scan mode of the passive touch IC 14 as specific scan through the universal transfer interface 13, so the passive touch IC 14 will scan only the traces specified by the master IC 12, for example the traces TR1 and TR6.

Figure 7:
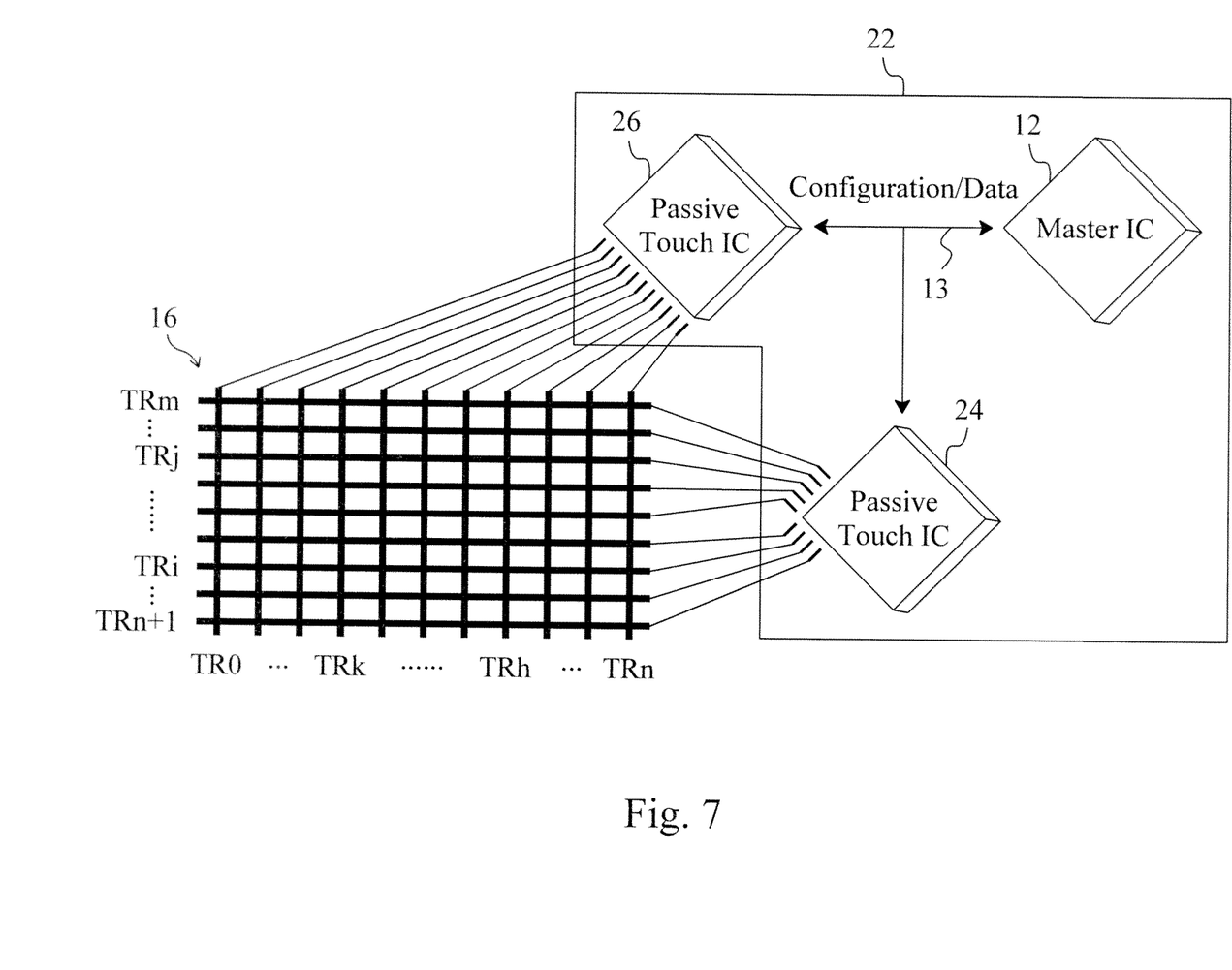
FIG. 7 is a schematic diagram of a second embodiment according to the present invention.

FIG. 7 is a schematic diagram of a second embodiment according to the present invention, in which a passive architecture 22 is used to scan a touch panel 16. The touch panel 16 has traces TR0-TRm, and the passive architecture 22 includes a master IC 12 and passive touch ICs 24 and 26 connected to the traces TR0-TRn and the traces TRn+1-TRm, respectively. By way of a universal transfer interface 13, the master IC 12 controls the passive touch ICs 24 and 26 to scan the traces TR1-TRn and the traces TRn+1-TRm, respectively, and provides the scan parameters required by such scanning. In this embodiment, the passive touch ICs 24 and 26 are existing touch ICs, for example the projected capacitance touch ICs, so there is no need for modification of the relevant hardware and additional cost otherwise required by such modification. The universal transfer interface 13 may be an $I^2C$ or an SPI. The way which the master IC 12 controls the passive touch ICs 24 and 26 is as described in the foregoing embodiment and needs not to be repeated herein. Since each of the passive touch ICs 24 and 26 only scans a portion of the touch panel 16, they can simultaneously scan their responsible portions of the traces TR0-TRm in a frame. If m=40 and n=20, the forty traces of the large scale touch panel 16 are completely scanned once, only with the time it takes to scan twenty traces, thereby effectively improving the frame rate.

Figure 8:
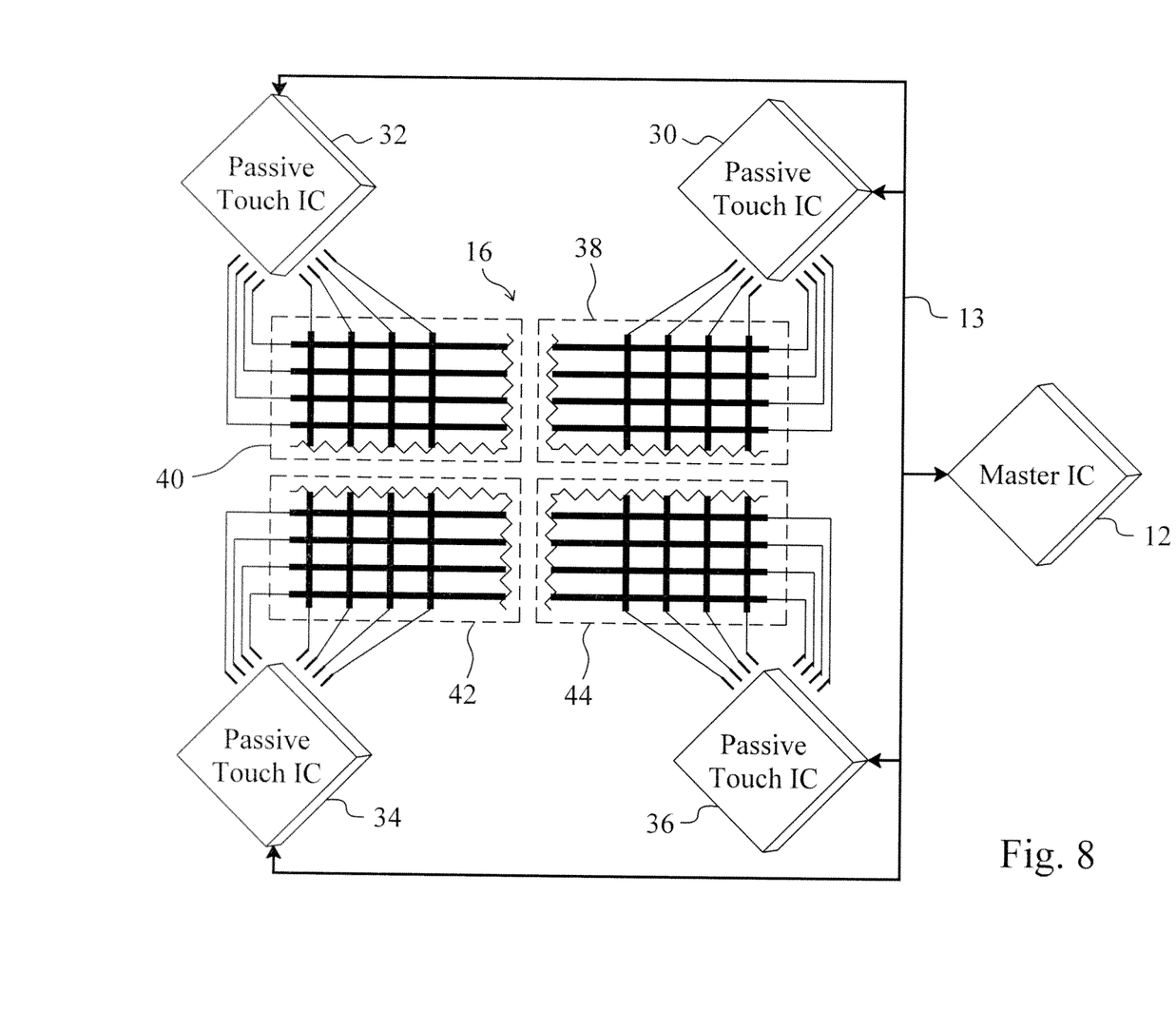
FIG. 8 is a schematic diagram of a third embodiment according to the present invention.

FIG. 8 is a schematic diagram of a third embodiment according to the present invention, in which a touch panel 16 is divided into four portions 38, 40, 42 and 44, and a passive architecture includes a master IC 12 and four passive touch ICs 30, 32, 34 and 36 connected to the portions 38, 40, 42 and 44, respectively. By way of a universal transfer interface 13, the master IC 12 controls the passive touch ICs 30, 32, 34 and 36 to scan the portions 38, 40, 42 and 44, respectively, and provides the scan parameters required by such scanning. In this embodiment, the passive touch ICs 30, 32, 34 and 36 are all existing touch ICs, for example the projected capacitance touch ICs, so there is no need for modification of the relevant hardware and additional cost otherwise required by such modification. The universal transfer interface 13 may be an $I^2C$ or an SPI. The way which the master IC 12 controls the passive touch ICs 30, 32, 34 and 36 is as described in the foregoing embodiment and needs not to be repeated herein. Since each of the passive touch ICs 30, 32, 34 and 36 only scans a portion of the touch panel 16, they can simultaneously scan their responsible portions of the traces in a frame, thereby effectively improving the frame rate.

Alternatively, the number of the passive touch ICs may be altered to meet the requirement in time, and different numbers of the passive touch ICs are controllable by using a master IC.

The present invention fully relies on a passive architecture, with which the operation of passive touch IC(s) is controlled by a master IC, and the passive touch IC(s) can only work under the command delivered by the master IC, such as scanning the touch panel with the relevant scan parameters. The passive touch IC stays idle and in standby until it receives the command, e.g. the scan parameter, from the master IC. Since the scan parameter of the passive touch IC to scan the touch panel is provided by the master IC, it is needless to prepare different firmware and analog parameter at the passive touch IC for scanning of different traces. Instead, a same firmware is accommodative. Because the process of the firmware is controlled by the master IC, the passive touch ICs initially appointed for different portions of the touch panel are exchangeable. Also, the master IC may, according to the actual result of the scanning, reconfigure the scan parameter to instruct the passive touch IC to scan some certain portions of the touch panel again. Thereby, the passive touch IC is not formalized and free for reuse, so as to significantly increase the application flexibility and efficiency of the passive touch IC.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A passive architecture for scanning a touch panel, comprising:
   at least two first ICs connected to the touch panel; and
   a second IC for providing each of the at least two first ICs with a corresponding scan parameter;
   wherein each of the at least two first ICs simultaneously scans the touch panel according to its corresponding scan parameter;
   wherein the corresponding scan parameter which the second IC provides for each of the at least two first ICs comprises different trace combinations in a first direction to be scanned; and
   wherein the corresponding scan parameter enables a corresponding one of the at least two first ICs to scan specified traces, the number of which is less than the total number of traces in the first direction of the touch panel.

2. The passive architecture of claim 1, wherein the corresponding scan parameter further comprises a scan mode and an analog parameter.

3. The passive architecture of claim 2, wherein the scan mode comprises a regular scan or a specific scan.

4. The passive architecture of claim 2, wherein the analog parameter comprises a gain, a scan time and a shift level.

5. The passive architecture of claim 1, wherein each of the at least two first ICs stays idle and in standby until it receives its corresponding scan parameter.

6. The passive architecture of claim 1, wherein the second IC receives detected data from the at least two first ICs and judges therewith to determine whether to reconfigure the scan parameter for each of the at least two first ICs to scan the touch panel again.

7. The passive architecture of claim 1, wherein the second IC receives detected data from the at least two first ICs and judges therewith to determine whether to reconfigure the corresponding scan parameter to scan only a certain portion of the touch panel.

8. The passive architecture of claim 7, wherein the certain portion comprises a portion where a ghost point possibly appears.

9. The passive architecture of claim 1, wherein each of the at least two first ICs is a projected capacitance touch IC.

10. The passive architecture of claim 1, wherein all of the at least two first ICs has a same firmware.

11. The passive architecture of claim 1, further comprising a universal transfer interface connected between the second IC and the at least two first ICs.

12. The passive architecture of claim 11, wherein the universal transfer interface comprises an I2C or an SPI.

13. The passive architecture of claim 1, which is intended for the purpose of eliminating ghost phenomenon.

14. A control method for scanning a touch panel, comprising the steps of;
 (A) generating a command by a first IC;
 (B) configuring each of at least two second ICs with a corresponding scan parameter according to the command; and
 (C) simultaneously scanning the touch panel by each of the at least two second ICs configured with the corresponding scan parameter in response to the command;
 wherein the corresponding scan parameter, which the first IC provides for each of the at least two second ICs comprises different trace combinations in a first direction to be scanned; and
 wherein the corresponding scan parameter enables a corresponding one at least two second ICs to scan specified traces the number of which is less than the total number of traces in the first direction of the touch panel.

15. The control method of claim 14, wherein the step B comprises the step of setting a scan mode and an analog parameter for the corresponding scan parameter.

16. The control method of claim 14, further comprising the steps of:
 transmitting detected data from the at least two second ICs to the first IC; and
 judging with the detected data by the first IC, to determine whether to generate a second command to reconfigure the at least two second ICs with updated scan parameters to scan the touch panel again in response to the second command.

17. The control method of claim 16, wherein the scanning the touch panel again comprises scanning only a certain portion of the touch panel where a ghost point possibly appears.

18. The control method of claim 14, further comprising the step of transmitting the command from the first IC to the at least two second ICs through a universal transfer interface.

19. The control method of claim 14, further comprising the step of transmitting detected data from the at least two second ICs to the first IC through a universal transfer interface.

20. The control method of claim 14, which is intended for the purpose of eliminating ghost phenomenon.

21. The control method of claim 14, wherein the first IC receives detected data from the at least two second ICs and judges therewith to determine whether to reconfigure the corresponding scan parameter to scan only a certain portion of the touch panel.

* * * * *